US009083651B2

(12) United States Patent
Bursell

(10) Patent No.: US 9,083,651 B2
(45) Date of Patent: Jul. 14, 2015

(54) CONTROLLING A NETWORK INTERFACE USING VIRTUAL SWITCH PROXYING

(71) Applicant: Citrix Systems, Inc., Fort Lauderdale, FL (US)

(72) Inventor: Michael Bursell, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 279 days.

(21) Appl. No.: 13/706,806

(22) Filed: Dec. 6, 2012

(65) Prior Publication Data

US 2013/0151685 A1 Jun. 13, 2013

Related U.S. Application Data

(60) Provisional application No. 61/568,104, filed on Dec. 7, 2011.

(51) Int. Cl.
*G06F 15/16* (2006.01)
*H04L 12/721* (2013.01)
*H04L 12/931* (2013.01)
*H04L 12/715* (2013.01)
*G06F 9/455* (2006.01)
*H04L 29/06* (2006.01)
*H04L 12/24* (2006.01)

(52) U.S. Cl.
CPC ............ *H04L 45/66* (2013.01); *G06F 9/45558* (2013.01); *H04L 45/64* (2013.01); *H04L 49/70* (2013.01); *G06F 2009/45579* (2013.01); *G06F 2009/45595* (2013.01); *H04L 41/12* (2013.01); *H04L 45/38* (2013.01); *H04L 63/0263* (2013.01); *H04L 63/0272* (2013.01)

(58) Field of Classification Search
CPC ..... H04L 63/0272; H04L 49/70; H04L 41/12; H04L 45/38; H04L 63/0263
USPC ................ 709/220, 223, 225, 229, 239, 238; 370/230, 235
See application file for complete search history.

(56) References Cited

U.S. PATENT DOCUMENTS

| 8,254,261 | B2 * | 8/2012 | Droux et al. | 370/237 |
|---|---|---|---|---|
| 8,442,048 | B2 * | 5/2013 | Aybay et al. | 370/392 |
| 8,937,862 | B2 * | 1/2015 | Aybay et al. | 370/230 |
| 2008/0155676 | A1 * | 6/2008 | Johnson et al. | 726/13 |
| 2011/0090915 | A1 * | 4/2011 | Droux et al. | 370/411 |
| 2011/0299537 | A1 * | 12/2011 | Saraiya et al. | 370/392 |
| 2012/0099591 | A1 * | 4/2012 | Kotha et al. | 370/392 |
| 2012/0291029 | A1 * | 11/2012 | Kidambi et al. | 718/1 |
| 2012/0317566 | A1 * | 12/2012 | Santos et al. | 718/1 |
| 2012/0324442 | A1 * | 12/2012 | Barde | 718/1 |
| 2013/0051400 | A1 * | 2/2013 | Fomin et al. | 370/402 |
| 2013/0315060 | A1 * | 11/2013 | Aybay et al. | 370/230 |
| 2014/0112343 | A1 * | 4/2014 | Lambeth et al. | 370/392 |

* cited by examiner

Primary Examiner — Moustafa M Meky
(74) Attorney, Agent, or Firm — Banner & Witcoff, Ltd.

(57) ABSTRACT

Methods and systems for permitting a controller within a virtualization environment to control access to devices virtualized within hardware are described herein. For example, a NIC may be able to request rules that define how network traffic is managed at the NIC's virtual switch. In some arrangements, the NIC may transmit a query for the matching rule to a proxy, which may determine whether it has a rule matching the request. If the proxy does not have a matching rule, the proxy may query a controller for the matching rule, which may transmit the rule to the proxy. The proxy may update its store of rules and transmit the matching rule to the NIC. Upon receipt of the matching rule, the NIC may update the rules stored in its virtual switch and may process the packet in accordance with the matching rule.

20 Claims, 14 Drawing Sheets

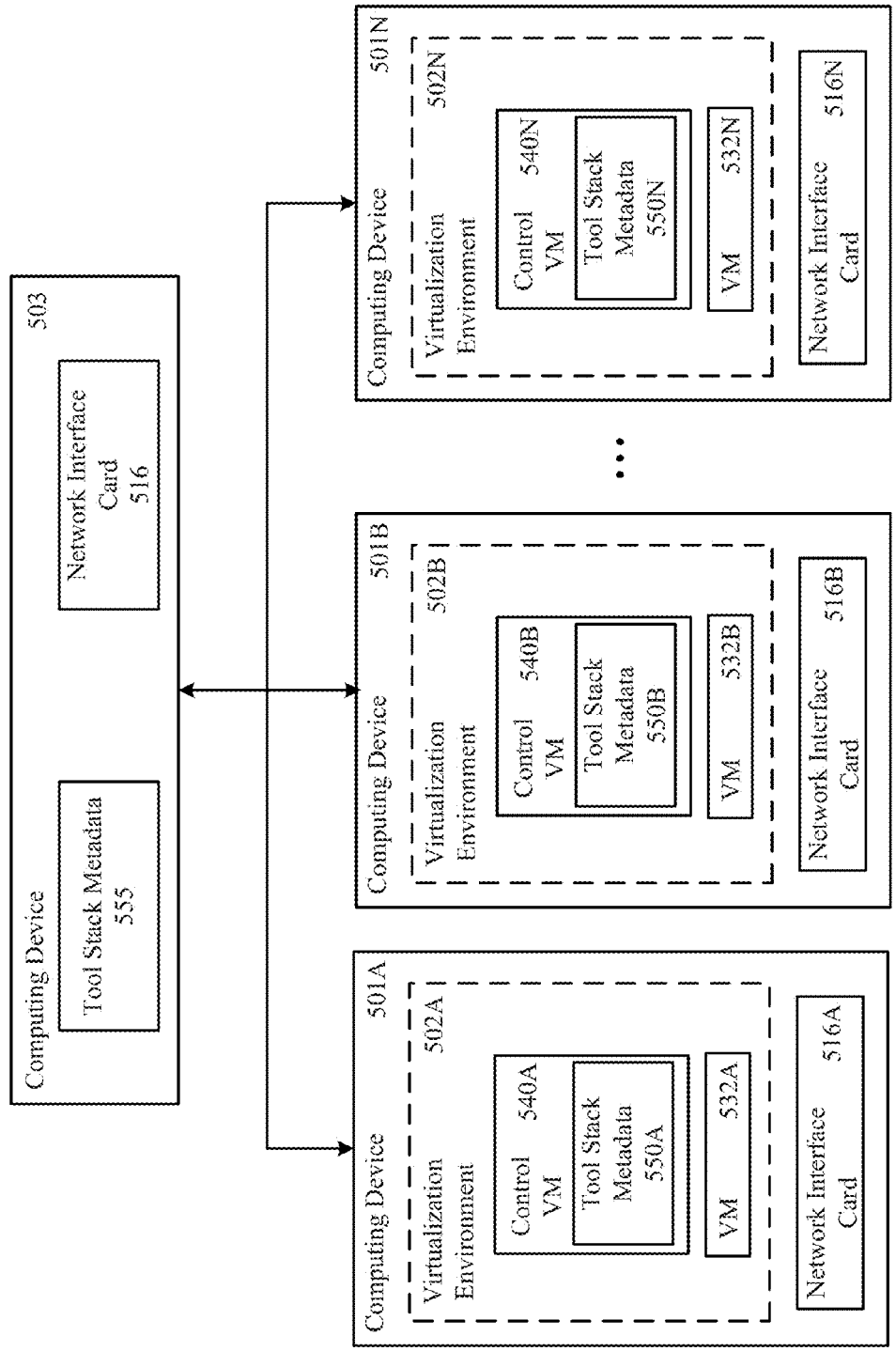

CONTROLLING A NETWORK INTERFACE USING VIRTUAL SWITCH PROXYING

CROSS REFERENCE TO RELATED APPLICATIONS

This application is a non-provisional of and claims priority to U.S. provisional application Ser. No. 61/568,104, filed Dec. 7, 2011, entitled "CONTROLLING HARDWARE VIRTUALIZED NETWORK INTERFACE CARDS USING VIRTUAL SWITCH PROXYING," herein incorporated by reference in its entirety.

FIELD

This disclosure generally relates to facilitating network communications within a computing environment, such as a virtualization environment. For example, some aspects permit a controller within a virtualization environment to control access to devices virtualized within hardware, such as by using a proxy in communication with the controller and a network interface card that includes a virtual switch.

BACKGROUND

Virtualization environments can typically take advantage of Single Root Input/Output Virtualization (SR-IOV) to virtualize physical devices that have a single port in order for the physical device to appear to have multiple ports. For example, SR-IOV can be used to virtualize network interface cards (NICs) such that a NIC having a single port can appear as though it has multiple ports. This low level virtualization of the NIC increases the speed with which a virtual machine can access and use the NIC and may provide control virtual machines within the ability to segregate and partition network traffic. While there are advantages to virtualizing NICs and other single port devices within the hardware layer, there are disadvantages to having the virtualized NIC controlled at the hardware level rather than being controlled by a control virtual machine within the virtualization environment.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below, regarding a need to support SR-IOV within a virtualization environment while permitting a controller within the virtualization environment to have a measure of control over access to the SR-IOV enabled NIC from within the virtualization environment, among other advantages.

Various aspects described herein relate to permitting a controller within a virtualization environment to control access to devices virtualized within hardware, such as a Single Root I/O Virtualization (SR-IOV) enabled network interface card. In some arrangements, a proxy, such as an OpenFlow proxy, may be in communication with one or more controllers using an OpenFlow protocol. The proxy may include rules that define how network traffic is managed at one or more virtual switches, such as a virtual switch of the SR-IOV enabled NIC. The proxy may also be in communication with the one or more virtual switches, each of which may conform to an OpenFlow specification.

Rules for managing how network traffic should be managed may be distributed between the controllers, NICs, and proxies. For example, a network interface card may be able to request rules that define how network traffic is managed at the network interface card's virtual switch. In some arrangements, the network interface card may transmit a query for the matching rule to a proxy, which may determine whether it has a rule matching the request. If the proxy does not have a matching rule, the proxy may query a controller for the matching rule, which may transmit the rule to the proxy. The proxy may update its store of rules and transmit the matching rule to the network interface card. Upon receipt of the matching rule, the network interface card may update the rules stored in its virtual switch and may process the packet in accordance with the matching rule.

Details of the above aspects, and others, will be apparent by the various embodiments described herein.

BRIEF DESCRIPTION OF THE DRAWINGS

The present disclosure is illustrated by way of example and not limited in the accompanying figures in which like reference numerals indicate similar elements and in which:

FIGS. 5A and 5B are block diagrams that depict embodiments of a virtualization environment that implements a network policy engine.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or executable instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
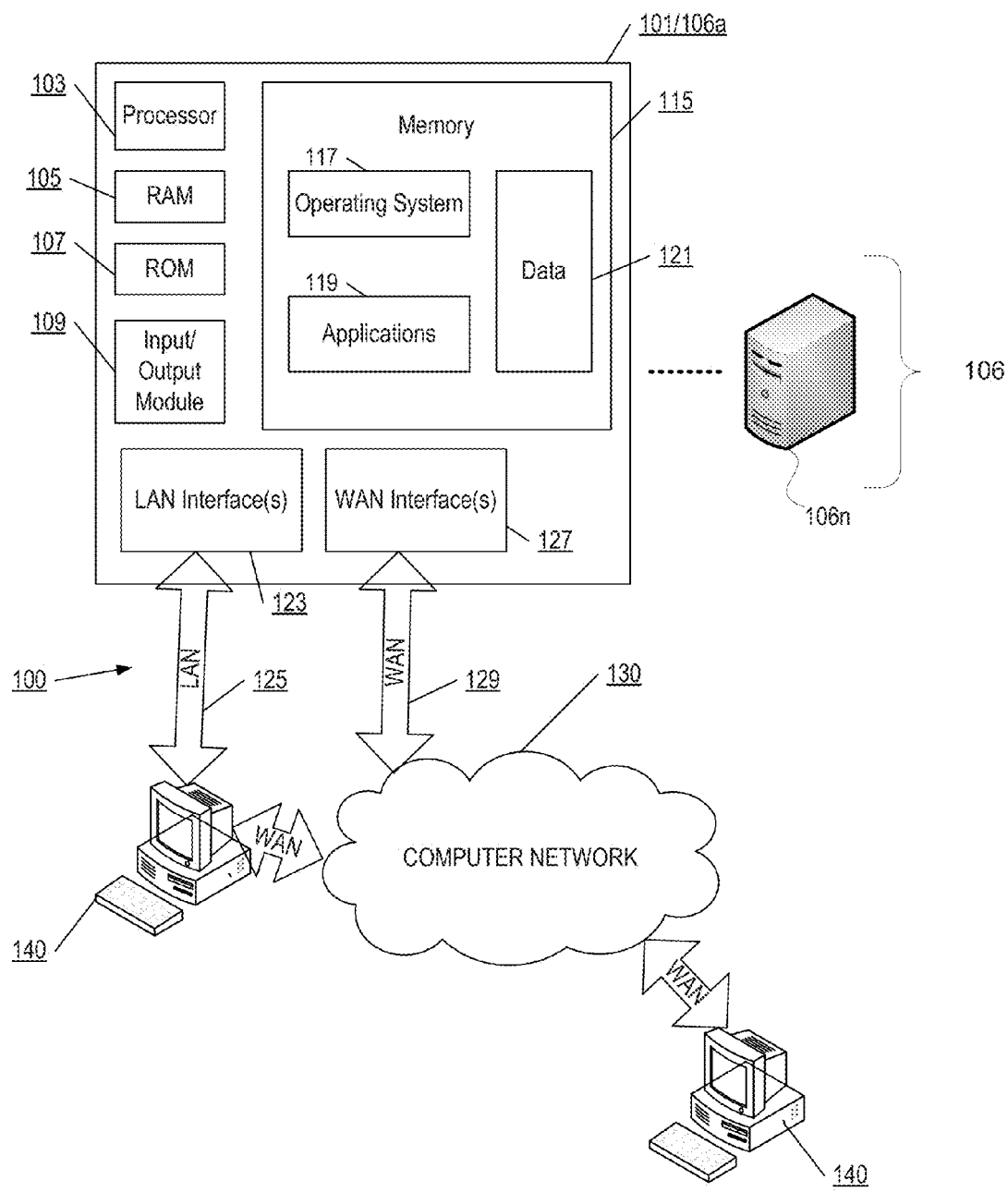
FIG. 1 illustrates an example operating environment in which various aspects of the disclosure may be implemented.

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
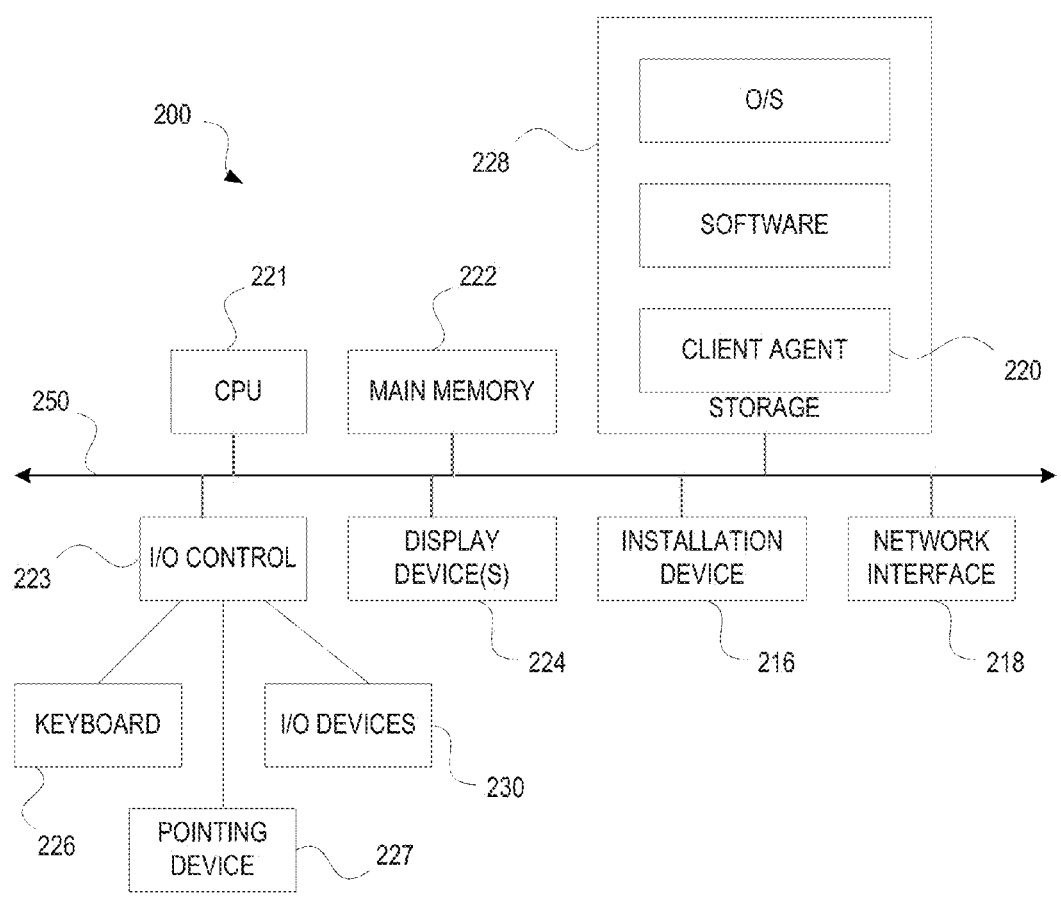
FIG. 2 illustrates a computing device that may be used in accordance with one or more illustrative aspects described herein.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

Figure 3:
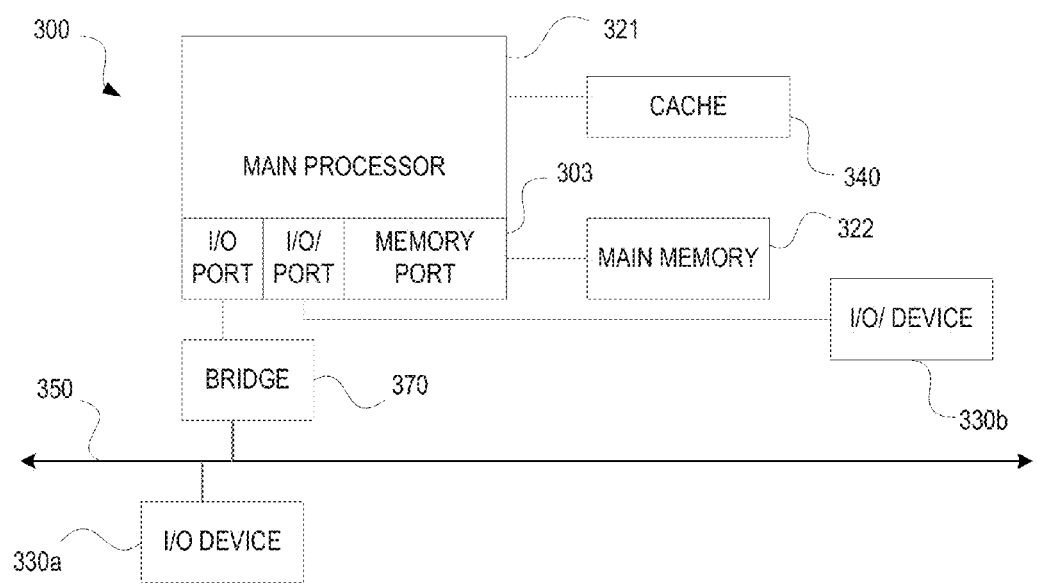
FIG. 3 illustrates a computing device that may be used in accordance with one or more illustrative aspects described herein.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif. While FIGS. 1-3 may be described with respect to specific examples of hardware and/or software that may be used, such examples are in no way limiting, but instead are merely illustrative of the type of resources that may be utilized as technology progresses.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 4:
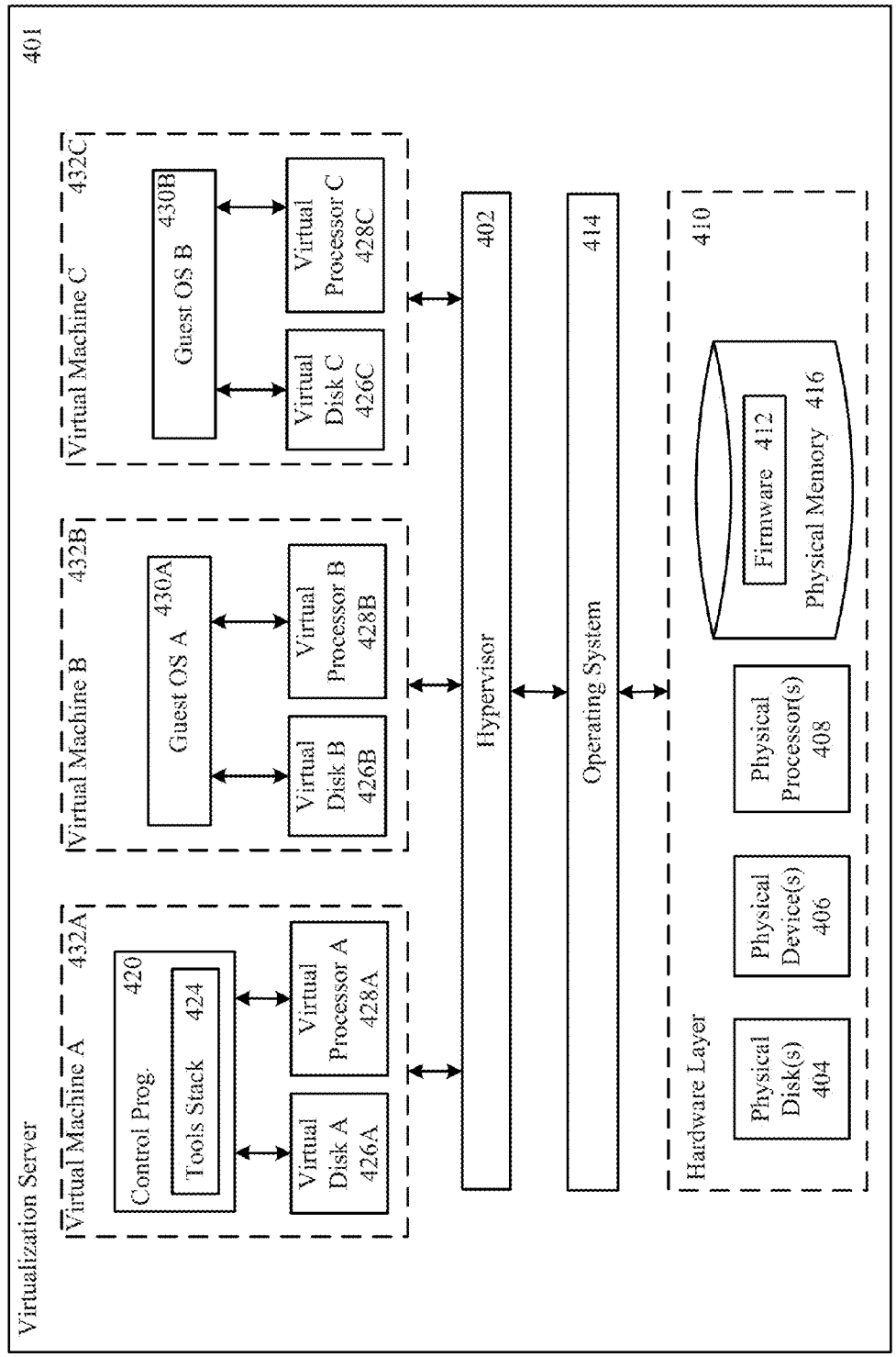
FIG. 4 is a block diagram that depicts embodiments of a virtualization server in accordance with one or more illustrative aspects described herein.

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

Figure 5A:
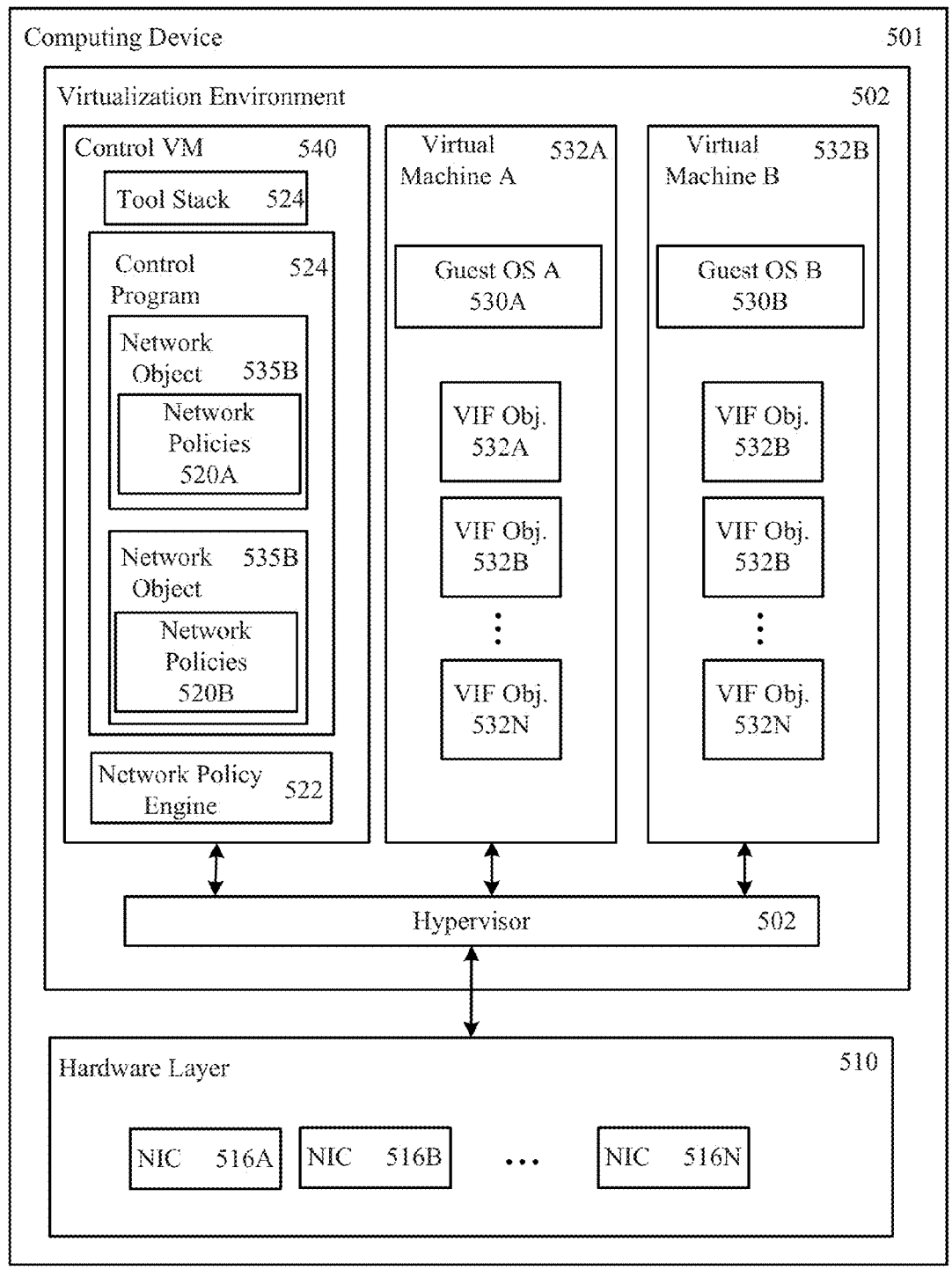

Illustrated in FIG. 5A is an embodiment of a computing device 501 that executes a virtualization environment 502 and that has a hardware layer 510 that can include multiple network interface cards (NIC) 516A-516N. The virtualization environment 502 can include a controller, such as control virtual machine 540, one or more additional virtual machines 532A-532B and a hypervisor 502. While a type 1 hypervisor (no O/S) is shown in FIG. 5A, a type 2 hypervisor may also be used as described above. In some instances each additional virtual machine 532 can execute a guest operating system (guest OS) 530A-530B, and can include one or more virtual interface (VIF) objects 532A-532N. The control virtual machine 540 can execute a control program 520 and a network policy engine 522. In some instances, the control program 520 can include a tool stack 524 and one or more network objects 535A-535B that include or implement network policies 520A-520B.

Further referring to FIG. 5A, and in more detail, in one embodiment the computing device 501 can be any computing device described herein. In some embodiments, the computing device 501 can be a server or a client machine. The computing device 501 can be referred to a host, a computer, a first computer, a second computer, a third computer, etc.

As the computing device 501 can be any computing device described herein, so too the hardware layer 510 can be any hardware layer 510 described herein and can include any computer hardware described herein. In one embodiment, the hardware layer 510 can include one or more NICs 516A-516N. The computing device 501 can include a single NIC 516, two NICs 516 or any other number of NICs 516. The NIC 516 can be any NIC, such as an SR-IOV enabled NIC, and each NIC 516 included in the hardware layer 510 can either be the same NIC or can be different types of NICs.

The virtualization environment 502 executing on the computing device 501, can be any virtualization environment described herein. The virtualization environment 502 can include any hypervisor configuration, such as the hypervisor configuration illustrated in FIG. 4. In one embodiment, the hypervisor 502 included in the virtualization environment 502 can be any hypervisor 502, or any hypervisor 502 described herein.

FIG. 5A illustrates a computing machine 502 that includes a virtualization environment 502 which includes a controller, such as control virtual machine 540. The controller can be any of the controllers described herein and may execute a control program 520, such as any control program 520 described herein. The control program 520 can, in some embodiments, include a tool stack 524 which can include metadata that describes one or more network configurations. While FIG. 5A illustrates a virtualization environment 302 that includes a control virtual machine 540 and two additional virtual machines 532A-532B, in some embodiments the virtualization environment 502 can include any number of virtual machines 532. The virtual machines 532 can execute a guest operating system 530, such as any guest operating system 530 described herein.

In some embodiments, the tool stack 524 can include metadata that describes the objects included in one or more of the virtual machines 532 of the virtualization environment 502. The metadata, for example, can include information about the current configuration of each virtual machine 532. Configuration information can include: network configurations used by objects within a virtual machine 532; the number and type of interface objects within a virtual machine 532; what objects are currently running in a virtual machine 532; and which external machines and networks are currently interfacing with the virtual machine 532. In one embodiment, the metadata can include network objects 535 and network policies 520. The tool stack 524, in some embodiments, can be used to generate a network implementation for a virtual machine 532 to use to communicate with other virtual machines 532 or to access a public network.

Tool stack 524 metadata, in some embodiments, can be stored in a storage repository of the control virtual machine 540. The metadata can be generated by the virtual machines 532 and objects executing within the virtualization environment 502. In other embodiments, the tool stack 524 metadata can be dynamically obtained from a storage repository remotely located from the host machine 501. For example, the control program 520 can stream or download the metadata from a remote computer that stores the tool stack metadata for a virtualization system. In other embodiments, the tool stack 524 metadata can be updated or generated using metadata downloaded or streamed from a remote computer. For example, when a control virtual machine 540 boots or executes a control program 520, the control virtual machine 540 or control program 520 can query a remote computer for tool stack metadata updates. In response, the remote computer can transmit, stream or otherwise send the control virtual machine 540 metadata relating to the virtualization environment 502.

The control program 520 can further include one or more network objects 535A-535B. Although FIG. 5A illustrates network objects 535A-535B (hereinafter generally referred to as network objects 535) included in the control program 520, in other embodiments the network objects 535 can be stored in any of the following places: the control virtual machine 540; the tool stack 524 metadata; or a remote storage repository located on a remote virtual machine 532 or a remote physical machine. A network object 535, in some embodiments, can be an object configured to connect to one or more VIF objects 532. In still other embodiments, the network object 535 can execute one or more network policies 520A-520B. The network object 535 can define a particular network policy. In another embodiment, the network object 535 can define a network configuration that includes one or more network policies 520A-520B. Thus, when a VIF object 532 connects to a network object 535, that VIF object 532 can function according to the network policy or configuration included within the network object 535.

FIG. 5A illustrates a virtualization environment 502 that includes two network objects 535A-535B. In other embodiments, the virtualization environment 502 can include a single network object 535, or multiple network objects 535. Network objects 535, in some embodiments, can connect with VIF objects 532 within the same virtualization environment 502, e.g. the same virtualization environment 502 that encompasses the network objects 535 and the VIF objects 532. In other embodiments, the network objects 535 can connect with VIF objects 532 located on the same physical machine 501 as the network objects 535, and/or VIF objects 532 that are located on a different physical machine than the physical machine 501 on which the network objects 535 are located. For example, a network object 535 on one computing device 501 can connect with VIF objects 532 on another computing device remotely located from the initial computing device 501.

Network policies 520 (e.g., 520A, 520B), in some embodiments, can be one or more policies associated with a particular network configuration. For example, a network policy 520 can include a set of guidelines (or rules) by which an object executing within a virtual machine 532 can interact with other objects within other virtual machines 532. In some embodiments, a network policy can be used to specify the attributes of a network that can be created between one or more virtual machines 532 and/or define how network traffic can be managed. These attributes can include: whether and how to encrypt data transmitted over the connection; which NIC cards to use to establish the connection; whether to restrict network traffic to a particular physical computer 501; whether to avoid transmitting network traffic to a particular virtual machine 532; whether network traffic can or should be transmitted over a physical NIC 516 to virtual machines 532 executing on a remote physical computer; whether to compress data before transmitting over the network; any other network attribute. Configuring the attributes of a network connection can further include specifying sub-attributes such as the type of encryption algorithm, the type of NIC card, and other similar sub-attributes.

Network policies 520 can be written in one or more policy languages and can be configured by administrators using a configuration application that interfaces with the control program 520. In some embodiments, the network objects 535 can implement a single network policy that specifies one or more attributes of a network configuration. In other embodiments, the network objects 535 can implement one or more network policies that together create a network configuration that specifies one or more attributes of a particular network.

Specifying attributes such as those requiring that network traffic not be transmitted to or generated by a particular virtual machine or physical machine, can be accomplished by associating the virtual or physical object with a tag. When creating the network policy 520, the policy language can reference the tag associated with the object. For example, an identification tag can be stored on or otherwise associated with a virtual machine 532. When a network policy 520 is created that specifies that network traffic should not be transmitted to the tagged virtual machine, the network policy 520 can identify the virtual machine using the tag. Thus, if the network object 535 that includes the network policy 520 is moved to a different virtualization environment 502 or computer 501, the network object 535 does not need to be reconfigured. Rather, the network object 535 will continue to implement a network configuration that prevents network traffic from being routed or otherwise transmitted to a virtual machine containing the specified tag. Therefore, when the network policy 520 is implemented, any virtual machine 532 in the new virtualization environment 502 or computer 501 that stores or is associated with the specified tag will be avoided such that it will not receive network traffic.

One example of a network policy can include the following:

```
ALLOW_CROSS_SERVER = true
REQUIRE_ENCRYPTION = true
PHYSICAL_IFS_ALLOWED = {TAG(testdev_network1),
TAG(testdev_network2)}
ISOLATE_FROM = {NAME(my_insecure_vm)}
```

The above code illustrates one embodiment of a network policy that specifies that one or more virtual machines which reside on an appliance, can reside on separate physical computers which are connected via a network. In this embodiment, the network traffic should be encrypted (e.g. REQUIRE_ENCRYPTION=true) and the traffic should be serviced by network interface cards 516 that have or are associated with the following tags: testdev_network1; and testdev_network2. Further, this embodiment illustrates a restriction on network traffic where the network traffic cannot traverse any network that is connected to a virtual machine 532 or appliance with the tag "my_insecure_vm."

The control virtual machine 540, in some embodiments, can execute a network policy engine 522 that can be used to enforce or implement one or more network policies 520. The network policy engine 522 can interface with one or more network objects 535 and one or more network policies 520 of the network objects 535. These policies 520 can be stored in a storage repository such as cache memory, and can be stored in a data element such as a database, a list, a table or any other storage element. In some embodiments, the policy engine 522 can be invoked by a control virtual machine 540 when the control virtual machine 540 receives an API call to change the state of one or more virtual machines 532. In other embodiments, the policy engine 522 can be invoked by the virtualization environment 502 or directly by the virtual machine 532 experiencing the lifecycle event. Upon being invoked, the network policy engine 522 can perform one or more functions including identifying one or more network objects 535 that correspond to the VIF object(s) included in the virtual machine 532 experiencing the life event. When the network policy engine 522 fails to identify a network object 535 that includes a network configuration that matches up with one or more VIF objects of the virtual machine 532, an error can be thrown by the network policy engine 522 indicating that a network configuration could not be assembled.

While FIG. 5A illustrates a network policy engine 522 executing on a controller, in some embodiments an instantiated instance of a network policy engine 522 can execute on any virtual machine 532. In still other embodiments, the network policy engine 522 can execute on the hypervisor 502.

In other embodiments, each virtual machine 532 can include one or more virtual interface (VIF) objects 532. A VIF object 532 can be used to establish a local network between two or more virtual machines 532. In some embodiments, the VIF object 532 can interface with a network object 535 such that the network object 535 enforces a network policy 520 that dictates what the attributes of the network connecting the VIF objects 532 should be. In other embodiments, one or more VIF objects 532 can register with a network object 535, such that the network object 535 can facilitate the creation of a local network between the VIF objects 532 registered with that network object. A VIF object 532, in some embodiments, can communicate with other VIF objects 532 over a local network. In other embodiments, the VIF object 532 can communicate with other VIF objects 532 on a remote physical computer such that a local network is established between the VIF objects 532, however, the local network requires interfacing with a NIC 516 to establish the local network with those VIF objects 532 on the remote computer. The network policy or configuration of the network object 535 can outline the attributes of the network created between the VIF objects 532.

In some embodiments, each virtual machine 532 can generate a notification when a lifecycle event occurs. A lifecycle event can include: starting or restarting a virtual machine; stopping a virtual machine; migrating a virtual machine; or other similar lifecycle events. The notification can include the generation of an alert that the virtual machine 532 can transmit to a control virtual machine 540. When a lifecycle event occurs, a determination can be made by a virtualization environment 502 as to whether a networking topology is required for that virtual machine 532. The networking topology can be created using network policies, and in some embodiments can include establishing a local network between the virtual machine 532 and other virtual machines, or establishing a connection between the virtual machine 532 and a physical network interface card 516. The control program 520 or virtualization environment 502 can create the network topology in accordance with one or more network policies 520.

Illustrated in FIG. 5B is one embodiment of a virtualization system 590 that includes one or more computing devices 501A-501N, and a control computing device 503 that includes tool stack metadata 555 and a network interface card 516. Each computing device 501A-501N can include a virtualization environment 502 that includes a control virtual machine 540 and one or more additional virtual machines 532, one or more NIC(s) 516, and a control virtual machine 540 that further includes tool stack metadata 550.

Further referring to FIG. 5B, and in more detail, in one embodiment the virtualization system 590 can be an environment where multiple computing device 501 executing their own virtualization environment 502, can communicate with one another and with a control computer 503 that provides each computing device 501 with access to shared resources. In some embodiments, the computing devices 501 and the control computer 503 can communicate via a network, such as any network described herein. In other embodiments, the computing devices 501A-501N and the controller can be any computing device described herein. In some embodiments, the computing devices 501A-501N can communicate with one another via a network and a NIC 516.

The control computer 503, in some embodiments, can include a NIC 516 such as any NIC 516 described herein. Further, the control computer 503 can communicate with the other computer 501 via a network 504 and the NIC 516 of the control computer 503.

In some embodiments, the control computer 503 can further include tool stack metadata 555 that can be a collection of metadata 555 for each computing device 501 in the system 590. The tool stack metadata 555, in some embodiments, is a combination of the tool stack metadata 550 for each computing device 501. When a control virtual machine 540 boots or when a virtualization environment 502 executes, the control virtual machine 540 or another application executing in the virtualization environment 502 can obtain metadata 550 from the pool of metadata 555 stored on the control computer 503. The obtained metadata 550 can be stored on the virtual machine 532 requesting the metadata 550, and can be used to update the metadata stored on the virtual machine 532. When a control virtual machine 540 stops executing, the metadata 550 can be transmitted to the metadata 555 pool. In some embodiments, the metadata 555, 550 can store network objects 535. Creating a local network that includes virtual machines 532 executing on remote physical computers can require using a centralized network object 535 stored in the tool stack metadata 555 of the control computer 503.

In some instances, a local network can be created between one virtual machine 532A on one computer 501A and a second virtual machine 532B on a second computer 501B remotely located from the first computer 501A. In this instance, the local network can be created using VIF objects in each virtual machine 532A, 532B. The VIF objects can register with a network object 535 such that the network object 535 can create a local network between the VIF objects in accordance with a network policy or configuration of the network object 535. In this example, the network object 535 can be part of metadata that is downloaded from a main metadata store 555, or the network object 535 can be accessed by the computing device 501A, 501B through a network between the computers 501A, 501B and the control computer 503.

Modifications may be made to the example configurations of FIGS. 5A and 5B. For example, as will be discussed further below, a proxy may be inserted into the virtualization environment such as, for example, by being inserted between one or more controllers and one or more NICs. The proxy may be located such that it may communicate with the controller and the NICs and may be configured to facilitate the communication between the controller and NIC.

Example embodiments using NICs (including SR-IOV NICs), OpenFlow controllers, and proxies that can communicate with the NICs and the OpenFlow controllers will now be discusses.

Figure 6A:
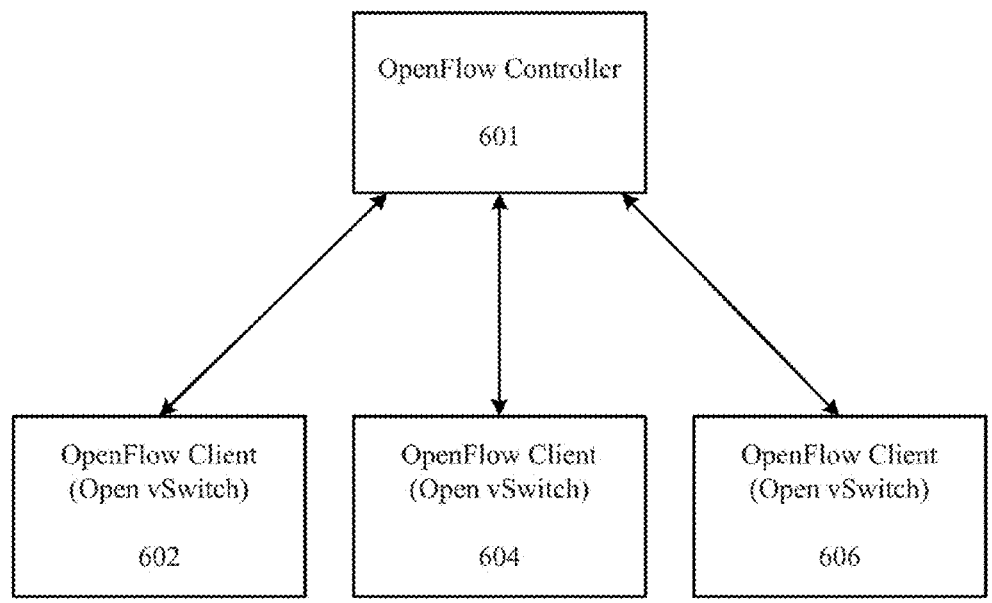
FIGS. 6A-6C are block diagrams that depict embodiments that provide communication between an OpenFlow controller and an OpenFlow client.
Figure 6B:
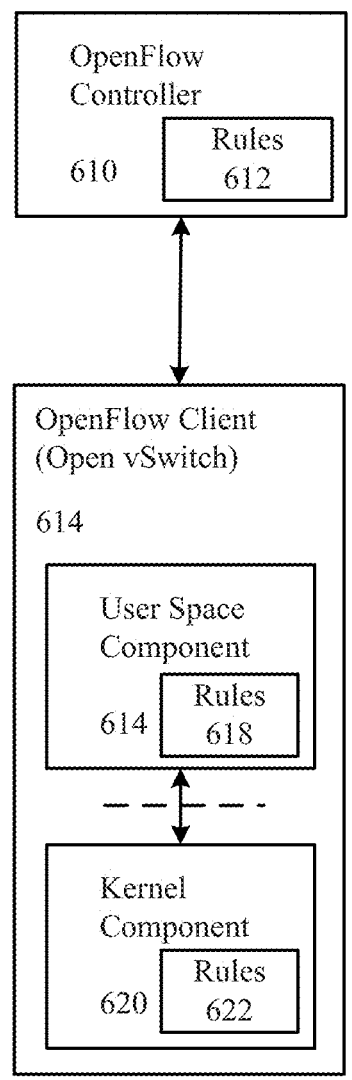
Figure 6C:
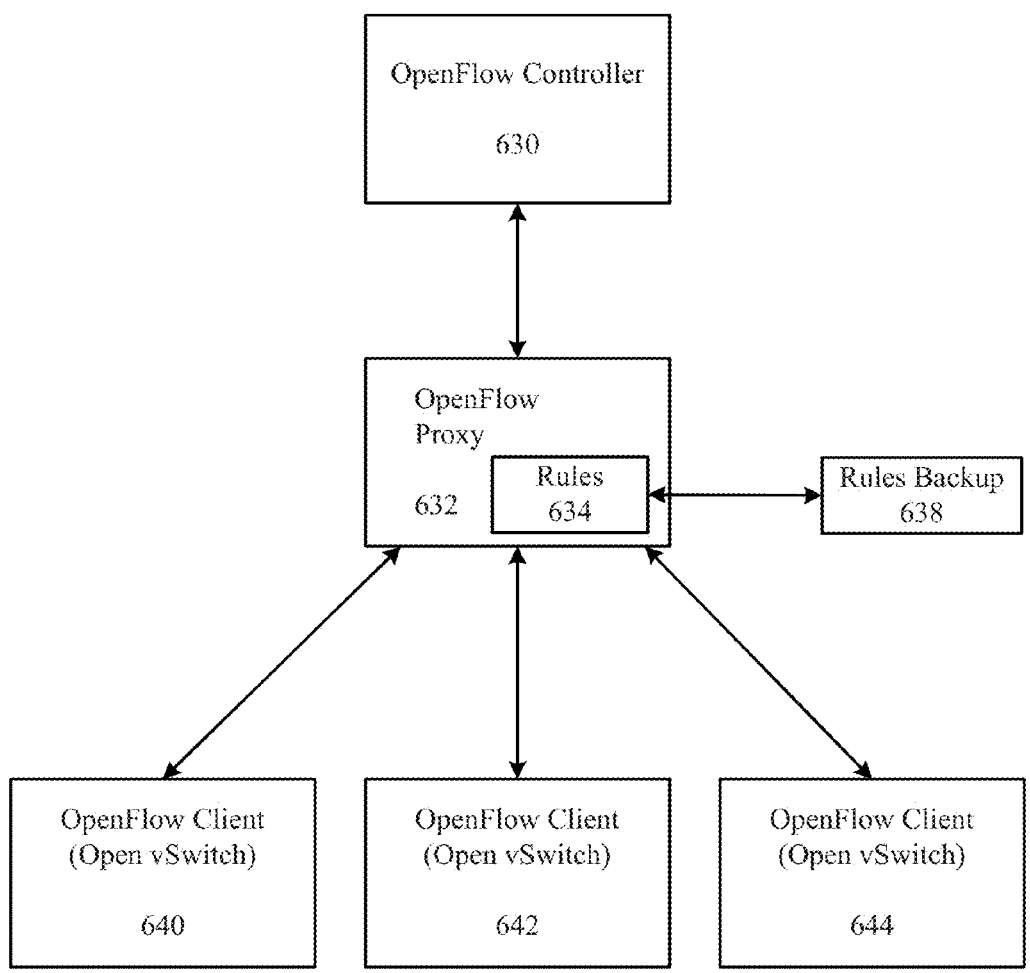

FIGS. 6A-6C are block diagrams that depict embodiments that provide communication between an OpenFlow controller and an OpenFlow client. In particular, FIG. 6A illustrates an embodiment where one or more OpenFlow controllers may be in communication with OpenFlow clients. As illustrated in FIG. 6A, an OpenFlow controller 601 may be in communication with one or more OpenFlow clients 602, 604 and 606. An OpenFlow client could be various types of network devices, such as an OpenFlow switch or an Open vSwitch. OpenFlow controller 601 can act as a switch to route and prioritize traffic according to any number of network policies. OpenFlow controller 601 may also be used to manage multiple virtual clients and enforce network policies amongst those virtual clients, such as OpenFlow clients 602, 604 and 606.

OpenFlow is a standard that can be included in various network devices, including switches, routers, and wireless access points. An OpenFlow switch, for example, may separate a data path from a control path. The data path may still reside on the switch, but some routing decisions may be controlled by a separate controller, e.g., OpenFlow controller 601. An OpenFlow switch, such as any of OpenFlow clients 602, 604 and 606, may communicate with OpenFlow controller 601 using a version of the OpenFlow protocol.

OpenFlow controller 601 may store various rules for routing certain types of packets. For example, a controller may include rules that define various actions that should be performed for a packet. In some embodiments, the rules may be stored as a table with fields defining packet identifiers, and one or more actions to take for each packet identifier. Actions may include such things as "send-out-port", "modify-field", "drop", etc., and various action types may be defined in an OpenFlow specification.

FIG. 6B illustrates a more detailed depiction of an embodiment where an OpenFlow controller is in communication with an OpenFlow client. There may be two main modes of operation between the OpenFlow client and OpenFlow controller. One mode of operation may be where the OpenFlow controller sends at least a subset of rules to the OpenFlow client. A second mode of operation may be where the OpenFlow client requests one or more additional rules from the OpenFlow controller.

As shown in FIG. 6B, the OpenFlow controller 601 comprises one or more rules 612 or policies that define how network traffic should be managed, such as by defining actions that should be taken when an OpenFlow client receives a packet. The OpenFlow controller 612 may broadcast these rules 612 and policies to any of the OpenFlow clients, such as OpenFlow client 615. In turn, the OpenFlow client may store the rules in either a user space component 614 or a kernel component 620. FIG. 6B illustrates user space component 614 and kernel component 620 having different rules stores (rules 618 and 622). While rules 618 and rules 622 may both be included on OpenFlow client 614, an OpenFlow client may include only one rules store in either the user space component or the kernel component. Upon storing the rules and policies, OpenFlow client 614 may use the rules and policies to manage network traffic. In some instances, the OpenFlow client 614 may update the rules 612 stored by the OpenFlow controller 610 with new rules or with adjustments to attributes of the actions.

When an OpenFlow client, such as example OpenFlow client 614, receives a packet, the client may first check its local rules to determine if the switch already knows how to process the packet (check for a match in rules 618 and/or rules 622). The OpenFlow client 614 may determine it can handle processing of the packet if one of the rules stored in the switch's local rule set matches a packet identifier of the packet. If OpenFlow client 614 does not find a match in the local rule set, the OpenFlow client 614 may query a controller for the matching rules, such as by sending the packet to the OpenFlow controller 610. The OpenFlow controller 610 may search the controller's rules 612 to determine if an entry matches. If an entry matches in rules 612, the entry and/or the action set for the entry may be sent to the OpenFlow client 614. The packet may also be transmitted from the OpenFlow controller 610 to the OpenFlow client 614 with the rule or entry set. The OpenFlow client 614, upon receiving the action set, may update its local rule set with a new entry matching the current packet and may execute the action set to appropriately process the packet. An action set can include one or more actions that should be executed upon receiving a packet. For example, the packet may be modified (decrement a time-to-live field or change a destination address) or forwarded to a port.

FIG. 6C illustrates an embodiment where an OpenFlow proxy may be used to facilitate the communication with an OpenFlow controller and an OpenFlow client. OpenFlow controller 630 may be similar to the OpenFlow controller 610 that was depicted in FIG. 6B and include its own store of rules (e.g., rules 612 of FIG. 6B). Each of OpenFlow client 640, 642 and 644 may be similar to the example OpenFlow client 614 that was depicted in FIG. 6B and include its own store of rules (e.g., rules 618, rules 622 of FIG. 6B). In some arrangements, an OpenFlow proxy, such as proxy 632, can be used to provide a measure of fault tolerance by introducing a redundant virtual machine that can be used to back-up or supplement rules and policies and that can help facilitate virtual machines to execute various processes, such as migration of a virtual machine from one domain to another.

When an OpenFlow client 640, 642 or 644 receives a packet, the client may search its local rules for an entry matching the packet. If a match is not found, the OpenFlow client 640, 642 or 644 may send the packet to the OpenFlow proxy 632 in order to query for rules defining how to process the packet.

Like a controller and client, OpenFlow proxy 632 may include rules 634 that define how network traffic should be managed at one or more OpenFlow clients. Accordingly, when the packet is received at OpenFlow proxy 632, rules 634 may be searched to determine if an entry matches the packet.

In some embodiments, a rules backup 638 may also provide a secondary store of rules for the OpenFlow proxy 632. Further, rules backup 638 may be a backup copy for rules 634 or rules 638 may include additional rules that can be retrieved by the OpenFlow proxy when needed, such as when OpenFlow proxy 632 determines that rules 634 does not include a matching entry for a packet. In such cases, rules 638 may be retrieved or searched to determine if a matching entry for the packet exists.

If a matching rule is found by the OpenFlow proxy 632, the OpenFlow proxy may transmit the rule(s) or action set to the OpenFlow client 640, 642 or 644. Otherwise, the OpenFlow proxy may query the OpenFlow controller for a rule by sending the packet to OpenFlow controller 630. Upon the OpenFlow controller 630 receiving the packet, the rules local to the controller may be searched and, if a matching entry in the rules is found, the matching rule or event set may be transmitted to the OpenFlow proxy 632.

Upon receiving a rule or event set from the OpenFlow controller 630, OpenFlow proxy 632 may update rules 634 and rules 638 appropriately, such as by storing the received rule or creating a new entry with the received action set in rules 634 or rules 638. OpenFlow proxy 632 may also transmit the rule or action set to OpenFlow client 640, 642 or 644.

Upon the OpenFlow client 640, 642 or 644 receiving the rule or action set from the OpenFlow proxy 632, the rules of the client may be updated, such as by storing the received rule or creating a new entry with the received action set in the client's rules. The OpenFlow client may also execute the rule or action set to process the packet.

Figure 7A:
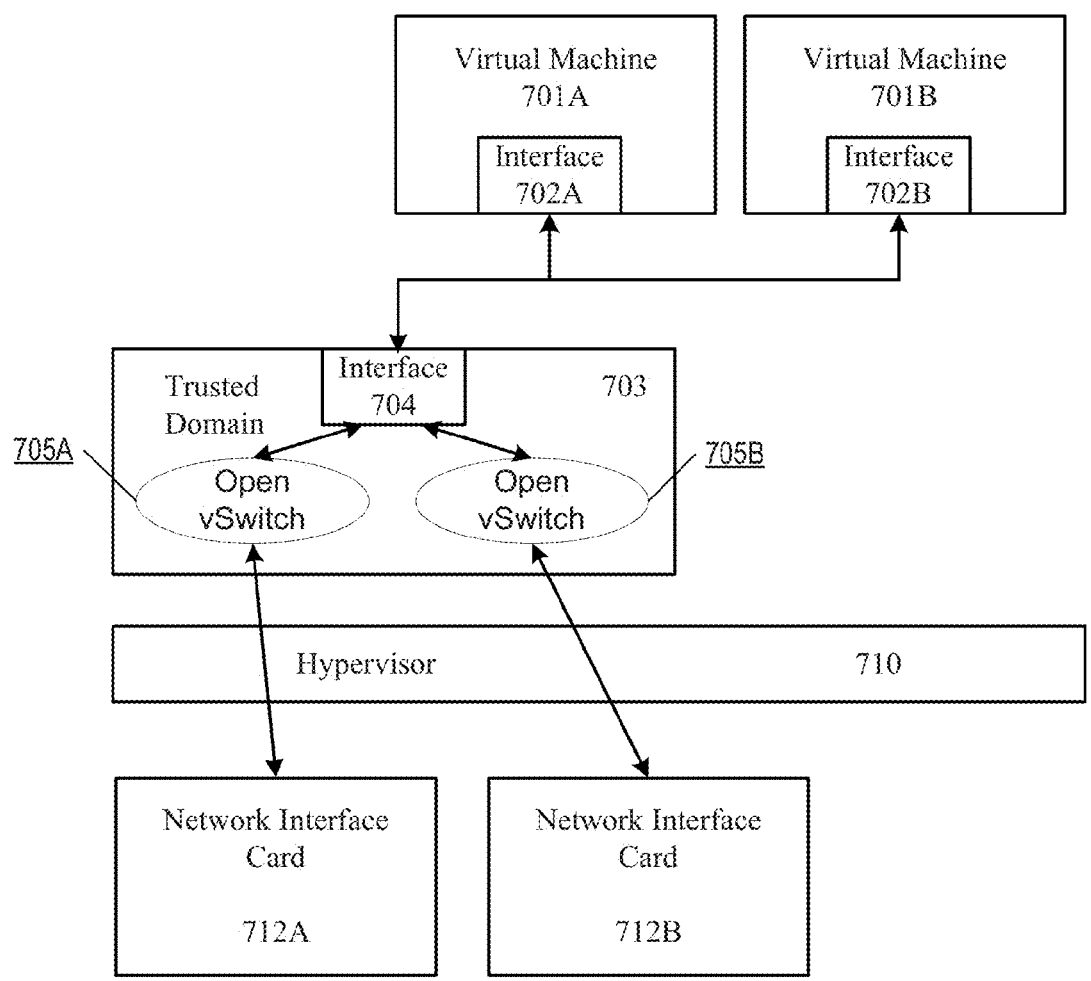
FIGS. 7A-7C illustrate block diagrams of embodiments where a virtualized environment includes one or more network interface cards.
Figure 7B:
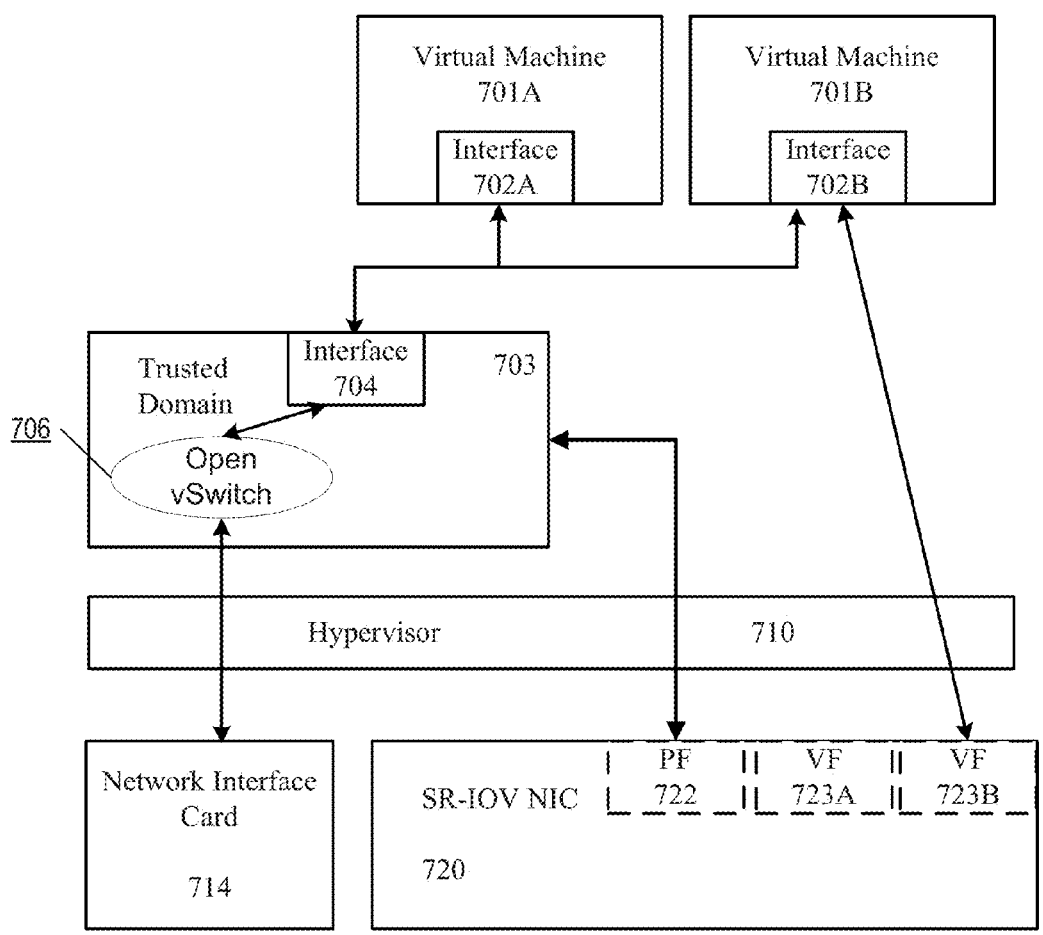
Figure 7C:
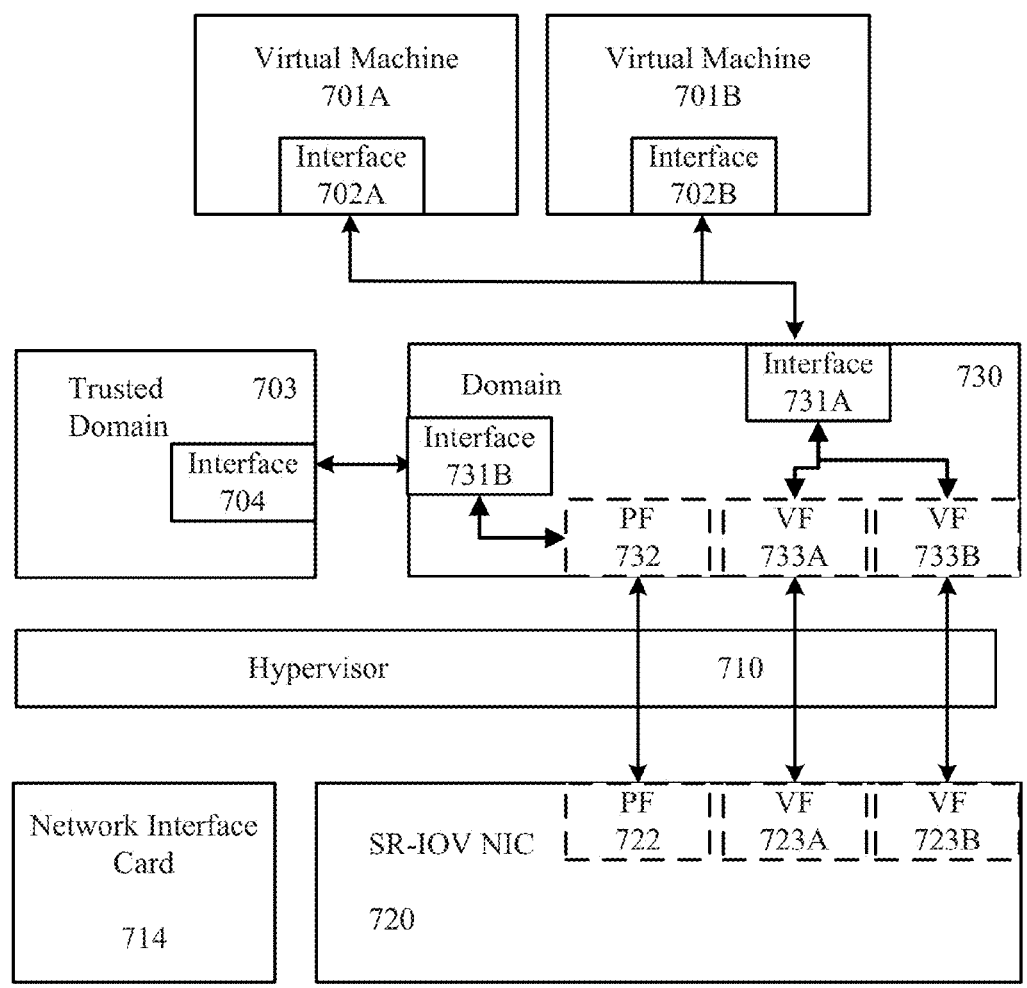

FIGS. 7A-7C illustrate block diagrams of embodiments where a virtualized environment includes one or more network interface cards. FIG. 7A illustrates an embodiment with network interface cards 712A and 712B in communication with a trusted domain 703. The virtualization environment may also include hypervisor 710, such as a Xen Hypervisor, or another type I or type II hypervisor. In the depicted embodiment, NICs 712A and 712B are not SR-IOV enabled.

Trusted domain 703 may also be referred to as domain zero (Dom0), and may perform management and administrative functions of the virtualization environment in order to perform various virtualization functions, such as executing one or more guest domains (e.g., virtual machines 701A and 701B).

In the depicted embodiment, virtual machines 701A and 702B may access the network via Dom0. In this embodiment, there is no requirement that a guest driver be installed to achieve network functionality within virtual machine 701A or 702B, and the virtualization environment may include host switching. For example, interfaces 702A and 702B of the virtual machines may communicate along a network path with interface 704 of the trusted domain 703. In some arrangements, interfaces 702A and 702B may both include NetFront processes, while interface 704 may include NetBack processes. Open vSwitches 705A and 705B may perform switching from the trusted domain 703 to a corresponding NIC. As illustrated, Open vSwitch 705A is mapped to NIC 712A and Open vSwitch 705B is mapped to 712B.

FIGS. 7B and 7C both utilize an SR-IOV enabled NIC. SR-IOV is a technology which, simply described, allows a virtual machine to communicate (e.g., directly) to a NIC rather than having to pass network traffic through a control virtual machine, such as a virtual machine manager or Dom0 (as depicted in FIG. 7A). SR-IOV allows for the virtualization of a network in hardware, rather than software, which has various advantages and disadvantages. For example, using SR-IOV technology (instead of Dom0-mediated networking) may provide a significant speed improvement in bandwidth and/or latency on a per-virtual machine basis. The ability to partition or segregate network traffic may be another advantage of SR-IOV. For example, SR-IOV may be able to partition/segregate traffic for multiple users, which otherwise may not be able to be on the same software switch (e.g., see the separate switches in Dom0 of FIG. 7A). Network traffic may also be partitioned/segregated into multiple security domains (e.g., a domain for traffic in a DMZ, a domain for traffic in a specific corporate department, and a domain for internal traffic).

By using SR-IOV, virtual machines may be able to bypass the virtual switch provided by the virtualization environment (e.g., a Citrix XenServer environment) and controlled by the control virtual machine.

Figure 8:
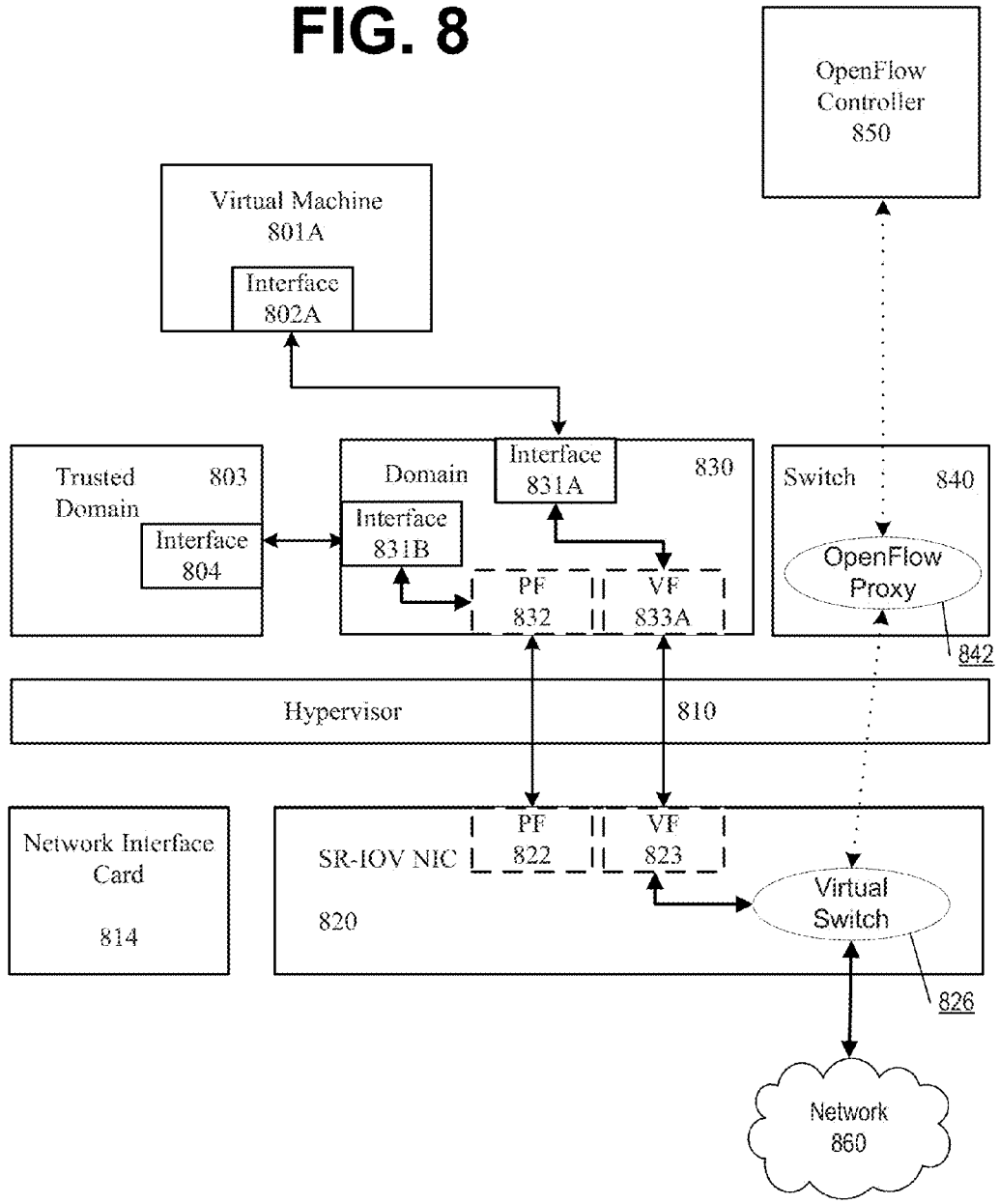
FIG. 8 illustrates a block diagram of an embodiment where a virtualization environment includes an SR-IOV NIC, an OpenFlow controller, and an OpenFlow proxy to facilitate communication with the OpenFlow controller and the SR-IOV NIC.

However, SR-IOV provides some difficulties when used in a virtualization environment. For example, when guests migrate between hosts, the virtual function that the virtual machine had on the previous host may not be carried to the new host. Further, the new host may not support SR-IOV (by lacking the appropriate cards or drivers). Additionally, in some embodiments using SR-IOV, such as cloud deployments, there may be a need to install guest drivers to the virtualization environment (which may require a manual install). FIGS. 7B and 7C illustrate embodiments that use SR-IOV, but exhibit one or more of the above disadvantages, or others. FIG. 8 illustrates an example embodiment that improves on arrangements using SR-IOV.

FIG. 7B illustrates an embodiment of a virtualization environment with an SR-IOV enabled NIC 720 and a trusted domain 703. Virtual Machine 701A and trusted domain 703 are in communication via interfaces 702A and 704B. Trusted domain 703 includes Open vSwitch 706, which is mapped to NIC 714. Unlike the embodiment depicted in FIG. 7A, a SR-IOV enabled NIC 720 is included. Trusted domain 703 may communicate with the SR-IOV enabled NIC 720 via a physical function (PF) 722. Virtual machine 701B may also be in communication with a virtual function (VF), such as VF 723B, which is mapped with virtual machine 701B. VF 723A is available to be mapped to another virtual machine.

As depicted, SR-IOV NIC 720 may be accessed by a virtual machine using PF 722 via trusted domain 703, or directly using VF 723A-B. The switching used by the trusted domain 703 to communicate with NIC 714 may be unavailable when communicating with the SR-IOV NIC 720 (e.g., SR-IOV NIC 720 may not be accessible via a switch similar to Open vSwitch 706). Direct communication to the SR-IOV NIC may require additional functionality. Accordingly, such embodiments may require creation of a special driver (e.g., by a NIC vendor) for an operating system (e.g., Windows driver) to manage the interface of a virtual machine in order for the virtual machine 701B to communicate with the SR-IOV enabled NIC 720, either via the trusted domain 703 or directly with the SR-IOV NIC 720 using VF 723B. For example, a driver to manage interface 702B may need to be installed. Such a driver, in some arrangements, may manage NetFront processes (which communicates with NetBack of Dom0) include a virtual function driver to facilitate the direct communication to SR-IOV NIC 720 from virtual machine 701B.

FIG. 7C illustrates an embodiment of a virualization environment that includes a trusted domain 703 and another domain 730. Domain 730, in some arrangements, may be a network driver virtual machine, or a DomNet connected to a set of VFs (723A & 723B) provided by an SR-IOV-enabled NIC 720 (e.g., by using a corresponding mapping of VFs in the domain 730, such as VF 733A and 733B). In the illustrated embodiment, virtual machines 701A and 701B may be connected to the domain 730, and there can be a direct mapping from each virtual machine 701A and 701B to a VF. For example, virtual machine 701A may be mapped to VF 733A and VF 723A and virtual machine 701B may be mapped to VF 733B and 723B. Use of domain 730, however, may cause performance degradation over the embodiment of FIG. 7B. A number of memory mapping techniques may allow much of the overhead in routing communication through domain 730 to be lessened.

The embodiment of FIG. 7C may also be extended to have multiple domains or DomNets where there are multiple SR-IOV-enabled NICs (segregation and partitioning of data may also be maintained). Like FIG. 7B, this virtualization environment also may not integrate with host switching thereby making virtual machine migration from one domain to another.

FIG. 8 illustrates a block diagram of an embodiment where a virtualization environment includes an SR-IOV NIC 820, an OpenFlow controller 850, and an OpenFlow proxy 842 to facilitate communication with the OpenFlow controller 850 and the SR-IOV NIC 820. This embodiment, and variations of the depicted embodiment, allow for the virtualization environment to maintain the virtual switching capabilities of SR-IOV enabled NICs (and, thus, the performance gains) while permitting a control over the management of the virtual machines accessing those NICs to thereby avoid some of the disadvantages described above. While FIG. 8 depicts an SR-IOV enabled NIC, various other NICs could be used. For example, a Multi-Root Input/Output Virtualization enabled NIC could be used in addition to or in place of SR-IOV enabled NIC 820. Other NICs that include a virtual switch or environments where an OpenFlow proxy allows for the bypassing of a host's internal switch are additional variations on the depicted virtualization environment of FIG. 8.

An OpenFlow proxy 842 can be situated within, for example, a switch domain 840 or domain 830 (e.g. DomNet). Here, a virtual machine 801A may be in communication with domain 830 which provides access to VF 823 on SR-IOV enabled NIC 820. NIC 820, in some cases, may have virtual switching capabilities, as depicted by virtual switch 826 (which is in communication with VF 823 and network 860). In some arrangements, the DomNet may provide a well-defined set of application programming interfaces (APIs) to allow domains to be created as drop-in "appliances." In such cases, there might be capabilities available to allow "stacking" or "layering" of domains to combine functionality. In some arrangements, the domains (e.g., 803, 830, and 840), proxy 842, NIC 820 and virtual switches (e.g., 826) may be included in the same host.

Control over the access provided the virtual machines may be provided via a control plane (shown by the dotted lines between virtual switch 826, OpenFlow proxy 842 and OpenFlow controller 850). As depicted in FIG. 8, OpenFlow proxy 842 is included in a switch domain 840 ("DomSwitch") provided by a host. Using the control plane, initial programming of the virtual switch 826 may allow it to become part of the switching infrastructure in which the host participates. The host may be participating in an infrastructure where OpenFlow controller 850 is operated by a third party, which can be remote from the other devices of the virtualization environment, including the switch domain 840, the SR-IOV NIC 820, and the virtual machine 801A. Additionally, the OpenFlow proxy may be in communication with virtual switches of another host in addition to virtual switch 826.

Figure 9:
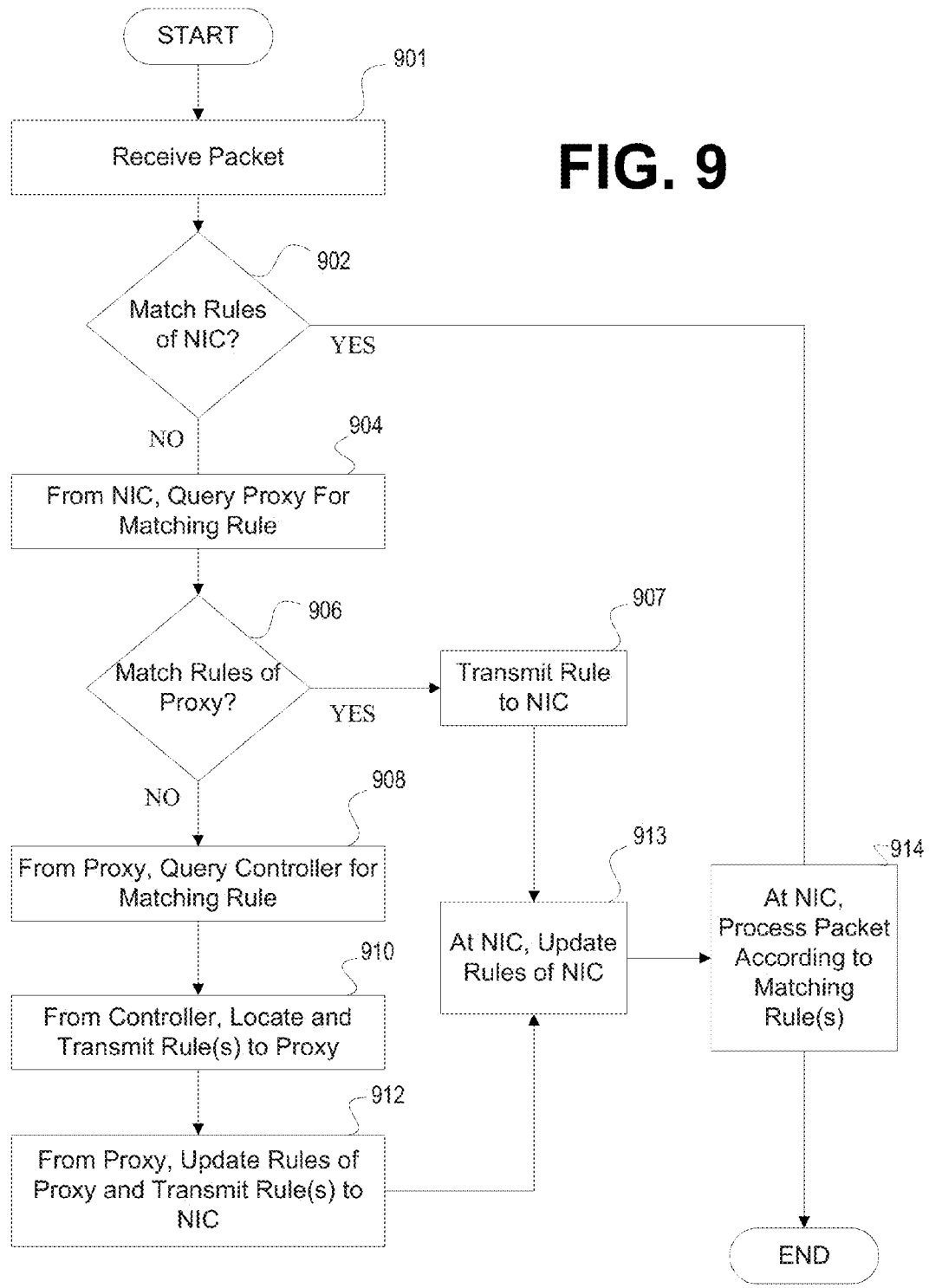
FIG. 9 illustrates an example method in which a NIC processes a received packet according to one or more rules defining how network traffic is managed at one or more virtual switches

FIG. 9 illustrates an example method in which a NIC processes a received packet according to one or more rules defining how network traffic is managed at one or more virtual switches. In particular, the example method is suitable for use in virtualization environments such as the environment depicted in FIG. 8. Thus, the example method of FIG. 9 will be illustrated using the devices of the virtualization environment depicted in FIG. 8. Various modifications could be performed to the virtualization environment depicted in FIG. 8, such as, for example, using a MR-IOV enabled NIC or another NIC that includes a virtual switch in place of SR-IOV enabled NIC 820.

At step 901, a packet may be received at a NIC. In some arrangements, the NIC, which may be SR-IOV enabled NIC 820 of FIG. 8, may have arrived at VF 823 via domain 830 and from virtual machine 801A of FIG. 8.

At step 902, the NIC may determine whether rules stored by the NIC match the packet (or a packet identifier included or based on the packet). For example, the rules may be stored by the virtual switch 826 of the SR-IOV enabled NIC and may be the same or similar to the rules discussed above in connection with FIGS. 6A-6C. If no matching rule is found in the NIC's rules, the method may proceed to step 904. If a matching rule is found, the method may proceed to step 914. In some instances, the rules of the virtual switch 826 may be a set of reduced-width rules or exception rules.

At step 904, the NIC has determined that no matching rule can be found in the rules local to the NIC, and the NIC may query a proxy for the matching rules for processing the packet. For example, when a packet is received by SR-IOV enabled NIC 820 for which virtual switch 826 has no matching rule, the virtual switch 826 can query the switch 840, which includes the OpenFlow proxy 842, by sending the packet to switch 840.

OpenFlow proxy 842 may have its own repository of rules. Thus, at step 906, the OpenFlow proxy 842 may determine whether rules stored by the NIC match the packet (which was received from the NIC). If a matching rule is found, the method may proceed to step 907. If no matching rule is found, the method may proceed step 908.

At step 907, a matching rule has been found by the OpenFlow proxy, and the proxy may transmit the matching rule (or rules, in some instances where multiple rules match the packet) to the NIC. For example the OpenFlow proxy may cause switch 840 to transmit the matching rules to the virtual switch 826 of the SR-IOV enabled NIC 820. The transmission may include one or more matching rules and the packet. Communication between the OpenFlow proxy and the NIC may be encrypted.

At step 908, the OpenFlow proxy did not find a match in its local rules. Accordingly, the OpenFlow proxy may transmit a query to an OpenFlow controller (e.g., OpenFlow controller 850) for the matching rules. In some instances, the rules stored by the OpenFlow proxy may be different than rules stored by the Open Flow controller. For example, a set of local rules may be stored at the OpenFlow proxy and, because the OpenFlow proxy receives the query from the NIC before the OpenFlow controller, the rules of the OpenFlow proxy can take priority (e.g, the proxy's rules can be searched for a match before querying the controller). In some embodiments, communication between the OpenFlow proxy and the OpenFlow controller may be encrypted. The encryption keys may be the same as the keys used for encrypting communication between the OpenFlow proxy and the NICs; however, different encryption keys could also be used.

Additionally, in some instances, the communication link with the OpenFlow controller may not be reliable or may sometimes be broken. Providing a NIC with the OpenFlow proxy over a more reliable communication link can provide for faster and more reliable rule retrieval. Moreover, the OpenFlow proxy may improve fault tolerance, because rules can be distributed as long as there is a link between the OpenFlow controller and the OpenFlow proxy and a link between the OpenFlow proxy and the NICs or virtual switches.

In some arrangements, the OpenFlow controller and the NIC may be incompatible with each other. For example, the network segment where the controller is resident and the network segment where the NIC is resident may be incompatible with each other. As another example, the OpenFlow controller may use an OpenFlow protocol that is different than the one used by the NIC (e.g., they use different versions or variants of OpenFlow). Accordingly, the OpenFlow proxy may need to convert communication from the controller/NIC so that it is compatible with the NIC/controller.

At step 910, the OpenFlow controller may locate a matching rule from its rules and once the matching rule (or rules) is found, the OpenFlow controller may transmit the matching rule to the OpenFlow proxy. In some arrangements, the transmission may include one or more matching rules and the packet.

At step 912, the OpenFlow proxy has received the matching rule from the OpenFlow controller, and the OpenFlow proxy may update its rules with the matching rule and transmit the matching rule to the NIC (or the virtual switch of the NIC). In some instances, the transmission to the NIC may include one or more matching rules and the packet.

In some embodiments, one or more OpenFlow controllers may be used and each of the OpenFlow controllers may be queried for a matching rule by the OpenFlow proxy. For example, controllers and proxies could be arranged in a hierarchy with different responsibilities being defined for each controller and proxy in the hierarchy. As one particular example where multiple controllers are used, a first OpenFlow controller may provide default rules for all devices, while a second OpenFlow controller may provide rules specific to a device or protocol, such as voice-over-IP (VoIP). In an instance where both controllers include a matching rule, the OpenFlow proxy may receive a matching rule from the first OpenFlow controller and a matching rule from the second OpenFlow controller. These rules may define different actions. The OpenFlow proxy may be able to determine which of the matching rules should have primacy in order to select whether the matching rule from the first OpenFlow controller or the matching rule from the second OpenFlow controller should be used to update the proxy's rules and be transmitted to the NIC. In some embodiments, the OpenFlow proxy could make this determination based on various criteria, including traffic levels of the network, time of day, or a controller priority.

At step 913, the NIC or virtual switch of the NIC has received the matching rule from the OpenFlow proxy, and the NIC or virtual switch may update its rules with the matching rule. For example, virtual switch 826 of SR-IOV enabled NIC 820 may receive one or more matching rules from switch 842, and may update the rules of the virtual switch 826 with the received one or more matching rules.

At step 914, the NIC or virtual switch may have updated its rules with the one or more matching rules. Accordingly, the NIC or virtual switch may proceed with processing the packet according to the matching rules and the actions specified by the rules. Actions can include, for example, actions to modify the packet, such as by decrementing a time-to-live field, changing a destination address. Actions may also include actions to transmit or drop a packet, such as by forwarding the packet to a port.

While FIG. 9 illustrates the steps of the example method as occurring in a particular order, modifications may be made to the order of steps. For example, in some embodiments, the NIC or virtual switch may perform step 914 prior to performing step 913.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

I claim:

1. A method, comprising:
   communicating, by a proxy, with one or more controllers using an OpenFlow protocol, wherein the proxy includes one or more rules defining how network traffic is managed at one or more virtual switches;
   communicating, by the proxy, with the one or more virtual switches, wherein the one or more virtual switches conform to an OpenFlow specification;
   receiving, by the proxy, a packet from a virtual switch of the one or more virtual switches;
   determining a rule matching the packet; and
   transmitting the rule matching the packet to the virtual switch.

2. The method of claim 1, wherein determining the rule matching the packet includes:
   matching a rule from a rule repository of the proxy to the packet.

3. The method of claim 1, wherein determining the rule matching the packet includes:
   querying, by the proxy, a controller of the one or more controllers for the rule matching the packet; and
   receiving the rule matching the packet from the controller.

4. The method of claim 1, wherein communicating, by the proxy, with the one or more virtual switches uses a second OpenFlow protocol different than the OpenFlow protocol.

5. The method of claim 1, wherein at least one of the one or more virtual switches is included in a Single Root Input/Output Virtualization (SR-IOY) enabled network interface controller (NIC).

6. The method of claim 1, wherein the proxy operates within a switch domain.

7. The method of claim 1, wherein the proxy operates within a host that includes the one or more virtual switches.

8. The method of claim 7, further comprising:
   communicating, by the proxy, with one or more second virtual switches, wherein a second host includes the one or more second virtual switches.

9. The method of claim 1, wherein the one or more virtual switches operate within a first network segment and the one or more controllers operate on a second network segment, wherein the first network segment and the second network segment are incompatible with each other.

10. An apparatus, comprising:
    one or more processors; and
    memory storing executable instructions configured to, when executed by the one or more processors, cause the apparatus to:
    communicate, as a proxy, with one or more controllers using an OpenFlow protocol, wherein the proxy includes one or more rules defining how network traffic is managed at one or more virtual switches;
    communicate with the one or more virtual switches, wherein the one or more virtual switches conform to an OpenFlow specification;
    receive a packet from a virtual switch of the one or more virtual switches;
    determine a rule matching the packet; and
    transmit the rule matching the packet to the virtual switch.

11. The apparatus of claim 10, wherein causing the apparatus to determine the rule matching the packet includes causing the apparatus to:
    match a rule from a rule repository of the proxy to the packet.

12. The apparatus of claim 10, wherein causing the apparatus to determine the rule matching the packet includes causing the apparatus to:

query a controller of the one or more controllers for the rule matching the packet; and receive the rule matching the packet from the controller.

13. The apparatus of claim 10, wherein communicating with the one or more virtual switches uses a second OpenFlow protocol different than the OpenFlow protocol.

14. The apparatus of claim 10, wherein at least one of the one or more virtual switches is included in a Single Root Input/Output Virtualization (SR-IOY) enabled network interface controller (NIC).

15. The apparatus of claim 10, wherein the proxy operates within a switch domain.

16. The apparatus of claim 10, wherein the one or more virtual switches operate within a first network segment and the one or more controllers operate on a second network segment, wherein the first network segment and the second network segment are incompatible with each other.

17. A system, comprising:
   a proxy; and
   one or more virtual switches that are configured to conform to an OpenFlow specification;
   wherein the proxy is configured to:
      store one or more rules defining how network traffic is managed at one or more virtual switches;
      communicate with one or more controllers using an OpenFlow protocol;
      communicate with the one or more virtual switches;
      receive a packet from a virtual switch of the one or more virtual switches;
      determine a rule matching the packet; and
      transmit the rule matching the packet to the virtual switch.

18. The system of claim 17, wherein the proxy being configured to determine the rule matching the packet includes the proxy being configured to:
   match a rule from a rule repository of the proxy to the packet.

19. The system of claim 17, wherein the proxy being configured to determine the rule matching the packet includes the proxy being configured to:
   query a controller of the one or more controllers for the rule matching the packet; and
   receive the rule matching the packet from the controller.

20. The system of claim 17, wherein the one or more virtual switches operate within a first network segment and the controller operates on a second network segment, wherein the first network segment and the second network segment are incompatible with each other.

* * * * *